US011273019B2

(12) United States Patent
Sagolla et al.

(10) Patent No.: US 11,273,019 B2
(45) Date of Patent: Mar. 15, 2022

(54) METHOD FOR PRODUCING A DENTAL PROSTHESIS (71) Applicant: Kulzer GmbH, Hanau (DE)

(72) Inventors: Jochen Sagolla, Frankfurt am Main (DE); Helmut Redemann, Frankfurt am Main (DE); Matthias Funk, Hanau (DE)

(73) Assignee: Kulzer GmbH, Hanau (DE)

( * ) Notice: Subject to any disclaimer, the term of this patent is extended or adjusted under 35 U.S.C. 154(b) by 355 days.

(21) Appl. No.: 15/540,443

(22) PCT Filed: Dec. 17, 2015

(86) PCT No.: PCT/EP2015/080305
§ 371 (c)(1),
(2) Date: Jun. 28, 2017

(87) PCT Pub. No.: WO2016/110392
PCT Pub. Date: Jul. 14, 2016

(65) Prior Publication Data
US 2017/0367798 A1 Dec. 28, 2017

(30) Foreign Application Priority Data
Jan. 7, 2015 (DE) .................... 10 2015 100 080.6

(51) Int. Cl.
*A61C 13/36* (2006.01)
*A61C 13/01* (2006.01)
(Continued)

(52) U.S. Cl.
CPC ...... *A61C 13/1016* (2013.01); *A61C 13/0001* (2013.01); *A61C 13/0004* (2013.01);
(Continued)

(58) Field of Classification Search
CPC ............ A61C 13/1016; A61C 13/0004; A61C 13/0016; A61C 13/0001; A61C 13/0006;
(Continued)

(56) References Cited

U.S. PATENT DOCUMENTS

| 2,641,802 A * | 6/1953 | Grant | A61C 13/10 264/19 |
| 4,161,065 A * | 7/1979 | Gigante | A61C 13/1013 264/18 |

(Continued)

FOREIGN PATENT DOCUMENTS

| CN | 106470636 A | 3/2017 |
| DE | 102014109563 A1 * | 1/2016 ......... A61C 13/1016 |

(Continued)

OTHER PUBLICATIONS

DE-102014109563-A1_Translation (Google Patents) (Year: 2020).*
(Continued)

*Primary Examiner* — Yogesh P Patel
(74) *Attorney, Agent, or Firm* — Marshall, Gerstein & Borun LLP (57) ABSTRACT

The invention relates to a method for producing a dental prosthesis from a prosthesis base and a plurality of prosthesis teeth, characterized by the following chronological steps:
providing the prosthesis teeth and the prosthesis base, wherein the prosthesis base comprises a plurality of tooth sockets for locating the basal surfaces of the prosthesis teeth;
applying a plastically deformable connecting means onto the tooth sockets and/or basally onto the prosthesis teeth;
locating the prosthesis teeth into the tooth sockets of the prosthesis base and in this situation connecting with the aid of connecting means to the prosthesis base in such a way that the prosthesis teeth, after locating in the
(Continued)

tooth sockets, are movable in relation to the prosthesis base, wherein the position and the alignment of the prosthesis teeth to the prosthesis base remain retained if no external force effect is exerted onto the prosthesis teeth;

changing the position and/or the alignment of at least one prosthesis tooth in the prosthesis base; and hardening the plastically deformable connecting means, and securely connecting the prosthesis teeth in this situation to the prosthesis base, wherein the position and the alignment of the prosthesis teeth in relation to the prosthesis base are retained.

The invention also relates to a dental prosthesis produced by such a method, and a set for carrying out such a method.

23 Claims, 3 Drawing Sheets

(51) Int. Cl.
*A61C 13/10* (2006.01)
*A61C 13/107* (2006.01)
*A61C 13/00* (2006.01)
*A61C 13/08* (2006.01)
*A61C 13/20* (2006.01)

(52) U.S. Cl.
CPC ...... *A61C 13/0006* (2013.01); *A61C 13/0024* (2013.01); *A61C 13/01* (2013.01); *A61C 13/08* (2013.01); *A61C 13/10* (2013.01); *A61C 13/203* (2013.01)

(58) Field of Classification Search
CPC ..... A61C 13/0024; A61C 13/01; A61C 13/08; A61C 13/10; A61C 13/203
See application file for complete search history.

(56) References Cited

U.S. PATENT DOCUMENTS

| 4,175,322 | A | 11/1979 | Tureaud |
| 4,184,253 | A | 1/1980 | Tureaud |
| 4,681,543 | A | 7/1987 | Monroy |
| 4,906,186 | A | 3/1990 | France, Jr. |
| 6,079,981 | A * | 6/2000 | Sekendur ............ A61C 13/0001 433/171 |
| 10,258,441 | B2 * | 4/2019 | Boehm ............... A61C 13/0004 |
| 2010/0086899 | A1 * | 4/2010 | Holzner ............ A61C 13/0004 433/199.1 |
| 2011/0236856 | A1 * | 9/2011 | Kanazawa ......... A61C 13/1003 433/199.1 |
| 2012/0296005 | A1 * | 11/2012 | Tanaka .................... A61L 24/06 523/116 |
| 2013/0316302 | A1 * | 11/2013 | Fisker ................ A61C 13/0004 433/171 |
| 2014/0087327 | A1 * | 3/2014 | Noack .................... A61C 13/12 433/50 |
| 2014/0272787 | A1 * | 9/2014 | Ginsburg ........... A61C 13/0004 433/171 |
| 2014/0272796 | A1 * | 9/2014 | Grobbee ............ A61C 13/1003 433/199.1 |
| 2015/0011673 | A1 * | 1/2015 | Yamagawa ........... A61L 27/446 523/115 |
| 2015/0086939 | A1 * | 3/2015 | Fisker ................ A61C 13/0006 433/29 |
| 2015/0216638 | A1 * | 8/2015 | Baaske ................ A61C 13/081 433/196 |
| 2015/0238291 | A1 * | 8/2015 | Hauptmann ....... A61C 13/0022 428/64.1 |
| 2017/0014212 | A1 * | 1/2017 | Fischer .................. A61C 13/10 |
| 2017/0071708 | A1 * | 3/2017 | Kohgo .................... A61L 27/16 |
| 2017/0135790 | A1 * | 5/2017 | Boehm ............. A61C 13/0004 |

FOREIGN PATENT DOCUMENTS

| EP | 2666438 | A2 | 11/2013 |
| EP | 2571451 | B1 | 3/2014 |
| JP | 2003126120 | A | 5/2003 |
| WO | WO-91/07141 | A1 | 5/1991 |

OTHER PUBLICATIONS

U.S. Appl. No. 61/935,710 (Year: 2014).*
Search Report in International Application No. PCT/EP2015/080305 dated Mar. 14, 2016, 4 pages.
Office Action in CN Application No. 201580072609.2 dated Jul. 31, 2019, 26 pages.
Communication Pursuant to Article 94(3) in EP Application No. 15816146.3 dated Mar. 3, 2021.

* cited by examiner

METHOD FOR PRODUCING A DENTAL PROSTHESIS

BACKGROUND OF THE INVENTION

Field of the Invention

The invention relates to a method for producing a dental prosthesis from a prosthesis base and a plurality of prosthesis teeth. The invention also relates to a dental prosthesis produced with such a method and a set for carrying out such a method.

Related Technology

The conventional method is the analog production of dental prostheses. To produce the prosthesis base, therefore, at the present time in most cases an analog method is used, with which an impression is first taken of the toothless jaw of the patient. From this impression, a plaster model of the patient's situation is prepared. Next, a function model of the prosthesis made of wax is built up on the plaster model, and fitted with prosthesis teeth. This wax prosthesis goes to the dentist in order for a test fit to be carried out on the patient, during which the settings of the artificial prosthesis teeth can be corrected. This corrected setup then goes back to the laboratory, which then removes the wax base and the setting of the artificial teeth is transferred into a final base made of plastic. To do this, a hollow mold or cast mold of both these parts is built up, in which the prosthesis teeth are already integrated. As a result, the prosthesis teeth are already inserted into the hollow mold. The mold is cast from a gum-colored plastic, and during the casting process the prosthesis teeth are connected to the prosthesis base. After the curing or hardening of the plastic, it undergoes subsequent processing in order to obtain the desired form.

Finished prosthesis bases can also be produced from a hardening plastic with an intermediate base of wax. In this situation, after the test fit and a possible adjustment of the artificial prosthesis teeth a front occlusion rim of silicone or gypsum plaster is produced in order to secure the position and alignment of the artificial teeth. After this, the wax base is removed, the ensuing cavity is, as a rule, filled out with auto-polymerizates and the artificial prosthesis teeth are therefore fixed on the solid prosthesis base, or, respectively, polymerized into place.

For the production of the dental prosthesis, prosthesis teeth are therefore placed manually and individually on a wax base on a plaster model of the toothless jaw. In the next step, this wax prosthesis is embedded in a flask with gypsum plaster, silicone, or gel (depending on the later processing technique), in order then, after the hardening of the embedding material, to release the wax base from the mold, in order to create a cavity for the prosthesis plastic. In this situation the prosthesis teeth remain in the embedding material. An appropriate plastic is injected or cast into the cavity, from which, after the hardening of the plastic, the dental prosthesis is obtained. During the setting up of the prosthesis teeth, they are adjusted and ground to match the particular oral situation of the patient by the dental technician and, if appropriate, also by the dentist.

Such a method is altogether very time-intensive, and therefore cost-intensive, and is based on a large number of skilled manual procedure steps. In the course of digitalization, the expense and effort is shifting to the production, setting up, and designing of the prosthesis bases and the prosthesis teeth in the CAD model, and the actual production is being taken over by machines (CAM machines).

Digital production methods are becoming increasingly important in the dental sector. Dental restoration elements, such as crowns and bridges, have for some years been produced by means of CAD/CAM technologies subtractively with milling methods (CAM—Computer-Aided Manufacturing, CAD—Computer-Aided Design). The problems of the connection, including the possibility of correction, however, arise in both conventional as well as in digital methods and processes.

A CAD/CAM method for producing a dental prosthesis is known from WO 91/07141 A1, wherein, with this method, a prosthesis base, based on an impression, is milled out of a plastic block.

Likewise, generative CAM methods such as SLM (Selective Laser Melting) for the production of crown, bridges, and models are steadily growing in importance, as well as stereolithography and DLP (Digital Light Processing) for dental products on a polymer base, such as temporary fittings, prostheses, gnatho-orthopedic apparatus, bite rails, drilling templates, or dental models. In this situation, the production of restoration elements on an acrylate base by means of RP methods (Rapid Prototyping methods) has hitherto still been subject to substantial restrictions. The production of multicolored restorations or restorations made of various different polymer materials (such as for melt compounds and dentin compounds) for the production of high quality and aesthetic dental restorations has previously only been possible by means of elaborate and expensive RP machines with a considerable number of material chambers, or by means of adhesive and jointing techniques.

Likewise, the production of material combinations (such as CoCr and polymer) by means of RP methods has hitherto been very elaborate and not implemented in a manner suitable for series production. The generative production of aesthetically demanding artificial teeth for part prostheses or total prostheses is at the present time not possible, since by means of stereolithography only one material or one color can be printed. The printing of multicolored artificial teeth is at the present time not possible. For this reason, the prosthesis base is produced by means of CAM methods (such as milling or printing) and previously made-up prosthesis teeth are adhesively bonded to the prosthesis base.

From EP 2 571 451 B1 and EP 2 666 438 A2 methods are known with which prosthesis teeth are embedded in a holding element in wax and then basally milled down. The milled-down prosthesis teeth are freed from the wax and then inserted into a prosthesis base and adhesively bonded there in order to produce a dental prosthesis.

U.S. Pat. No. 4,175,322 A1 and U.S. Pat. No. 4,184,253 A1 disclose methods with which two or three parts of a full prosthesis can be moved relative to one another in a wax base, in order to be able to adjust the full prosthesis to the shape of the oral cavity of the patient.

In particular with such new manufacturing methods for prosthesis bases made of plastic, which were prepared by milling or by additive methods, a correction of the tooth set-up cannot be carried out simply without further ado, as is the case with the conventional analog methods. This possibility of correction directly in contact with the patient is practical, however, since the transfer of the occlusal position and the set-up of the prosthesis teeth from the toothless jaw of the patient into an analog or also a digital model is otherwise prone to error. With these production methods, the prosthesis base is produced completely and irreversibly. The jaw ridge of the prosthesis base is already provided with tooth sockets in the form of precisely matched recesses to receive the artificial prosthesis teeth. These prosthesis teeth can already be inserted in precise match into the prosthesis base. Securing is carried out with an adhesive or a polymer. With this technique, however, the possibility of correction is lost.

Such methods therefore have the disadvantage that minor corrections of the position and the alignment of the individual prosthesis teeth in the prosthesis base by the dentist or dental technician can only be carried out with considerable effort. The prosthesis teeth must be processed occlusally or removed, wherein the prosthesis base is then ground, or the prosthesis teeth are ground basally, in order to adjust their position and location.

SUMMARY

The object of the invention is therefore to obviate the disadvantages of the prior art. In particular, a method is to be provided with which a simple correction of the position and/or of the alignment of the prosthesis teeth in the prosthesis base by the dentist or the user is possible, in order to be able to adjust the dental prosthesis in a simple manner to the requirements and the oral cavity situation of the patient. In addition to this, it is also intended that the simplest, most complete, and most economical production possible of the prosthesis base and the dental prosthesis should be possible. It is a further object of the invention to demonstrate a method as to how the artificial prosthesis teeth in the prosthesis base can be irreversibly connected to the prosthesis base in the desired position and/or alignment. By way of the invention, it is also intended that a finished dental prosthesis and a set for the implementation of a method according to the invention should be provided.

The objects of the invention are solved by a method for producing a dental prosthesis from a prosthesis base and a plurality of prosthesis teeth comprising the following chronological steps:
A) Provision of the prosthesis teeth and the prosthesis base, wherein the prosthesis base comprises a plurality of tooth sockets for locating basal surfaces of the prosthesis teeth;
B) a plastically deformable connecting means is applied onto the tooth sockets and/or basally onto the prosthesis teeth;
C) the prosthesis teeth are located in the tooth sockets of the prosthesis base and in this situation are connected with the aid of the connecting means to the prosthesis base in such a way that the prosthesis teeth, after locating in the tooth sockets, are movable in relation to the prosthesis base, wherein the position and the alignment of the prosthesis teeth to the prosthesis base (due to the connecting means) remain retained if no external force is exerted onto the prosthesis teeth;
D) the position and/or the alignment of at least one prosthesis tooth in the prosthesis base is changed; and
E) the plastically deformable connecting means is hardened, and the prosthesis teeth in this situation are securely connected to the prosthesis base, wherein the position and the alignment of the prosthesis teeth in relation to the prosthesis base remain retained.

The expression "coronal" (Latin corona, 'crown') signifies on the tooth crown and towards the tooth crown, as a location and direction designation in relation to the teeth, comprising the occlusal surface and the circumferential areas of the tooth prosthesis surrounding the occlusal surface. The designation "occlusal" signifies on the occlusion surface or masticatory surface and towards the occlusion surface as a location and direction designation in relation to the teeth. The designation "basal" designated the side opposite the occlusal surface, wherein, with the designation "basal", areas adjacent to the neck of the tooth (cervis dentis) and the adjacent circumferential surface of the prosthesis teeth can also be included. These terms are also used for prosthesis teeth.

The consistency of the connecting means is preferably firm and wax-like, and should nevertheless be sufficiently flexible that a manual adjustment and a manual correction of the position and/or the alignment of the prosthesis teeth are possible. The connecting means is preferably of wax type. As connecting means, preferably a largely homogeneous or entirely homogeneous paste or compound of wax-like material is used.

The expression "tooth sockets" designates according to the invention those structures in the prosthesis base which are provided for the connecting with the prosthesis teeth. In principle, the prosthesis teeth can be secured simply on the external smooth and even jaw arch of the prosthesis base. Due to the fact that the jaw arch of the prosthesis base is not formed as being the same overall (for example due to the curvature of the surfaces, the broadening of the jaw saddle in the area of the posterior teeth for anatomical reasons, etc.), the tooth sockets can in extreme cases therefore already be formed by the individuality of the surface of the prosthesis base over the length of the jaw arch. Specifically, with the basal surface of the prosthesis teeth adjusted, the prosthesis teeth can also be located only on the matching part areas of the prosthesis base.

Preferably, however, the prosthesis base should only be pre-shaped in the area of the tooth sockets to such an extent that an arrangement and approximate position and approximate alignment of the prosthesis teeth are provided. In this situation, complete tooth sockets can be provided as recesses in the prosthesis base, which still provide sufficient space for receiving the connecting means, and which surround a large part of the neck of the tooth. Even shallow cavities, however, which only surround the basal area of the neck of the tooth, and therefore only predetermine the arrangement and the approximate positions of the prosthesis teeth, would also be conceivable and possible as tooth sockets. The area of the neck of the tooth and the tooth sockets are in this case preferably molded completely with the connecting means. It is likewise possible for the tooth sockets, as an alternative to a depression or together with a depression, to be formed by or with elevations on the jaw arch of the prosthesis base, which correspond to indentations on the basal surface of the prosthesis teeth.

With the tooth sockets according to the invention, preferably configured as depressions, it is also possible to speak of the prosthesis teeth being inserted into the tooth sockets and movable in the tooth sockets, instead of speaking of locating the prosthesis teeth at the tooth sockets. The tooth sockets are then suitable for receiving the prosthesis teeth.

It is self-explanatory that the plastic deformability of the connecting means changes due to the hardening, or, respectively, that after the hardening the connecting means is no longer plastically deformable after the hardening.

The expression "position of the prosthesis teeth relative to the prosthesis base" is understood to mean the relative arrangement of the prosthesis teeth in relation to the prosthesis base in spatial terms. The expression "alignment of the prosthesis teeth relative to the prosthesis base" is understood to mean the inclination of a fixed axis of the prosthesis teeth in relation to the prosthesis base.

"Movable" in the present connection signifies that the prosthesis teeth are movable in the prosthesis base, but not fully freely movable. The inserted prosthesis teeth can then, in or at the tooth sockets provided for the fixing of the prosthesis teeth, be rotated or tilted by a few degrees in relation to the prosthesis base, or, respectively, displaced by a few tenths of a millimeter.

With the invention it is also proposed that, with a movement of the prosthesis teeth relative to the prosthesis base, or with a change of the position and/or the alignment of the at least one prosthesis tooth relative to the prosthesis base, the connecting means undergoes plastic deformation.

In this way it is ensured that the prosthesis teeth are not moved back again, due to elastic forces of the connecting means, into, or in the direction of, the previous position and/or alignment. In this situation, the connecting means should as far as is possible not become detached from the prosthesis teeth.

It can also be provided that, in order to change the position and/or the alignment of the at least one prosthesis tooth relative to the prosthesis base, a force is exerted on the at least one prosthesis tooth, wherein preferably the prosthesis base is fixed beforehand and remains fixed, at least during the effect of the force on the at least one prosthesis tooth.

Due to the specific effect of the force, the situation can be achieved in that a change is only caused specifically and deliberately in the position and/or the alignment of the at least one prosthesis tooth relative to the prosthesis base.

Particularly preferred embodiments of the method according to the invention can also provide for the connecting means to exhibit a yield strength, below which the connecting means is elastic, and above which the connecting means is plastically deformable.

The yield strength is a mechanical threshold stress (defined by the ratio of a force to a surface onto which the force takes effect), which must be reached in order to cause a plastic deformation of a material (in this case, of the connecting means). Due to this material property of the connecting means, it can be ensured that only a specific imposition with a force which leads to a stress above the yield strength will cause a plastic deformation of the connecting means, and not already the weight force of the prosthesis teeth, or forces of acceleration which, at the movement of the prosthesis teeth connected by the connecting means to the prosthesis base, take effect on the connecting means due to the inertia of the prosthesis teeth.

In this situation it can be provided that the connecting means exhibit a yield strength between $10^4$ N/m$^2$ and $10^7$ N/m$^2$, preferably a yield strength between $10^4$ N/m$^2$ and $10^6$ N/m$^2$, and particularly preferably a yield strength between $10^4$ N/m$^2$ and $10^5$ N/m$^2$.

The yield strength has the dimension of a stress, and is determined by the ratio of the amount of a force to the surface on which this force takes effect. To set the lower yield strength, it was assumed that a prosthesis tooth weighs 1 gram, has a contact surface of 10 mm$^2$ to 100 mm$^2$, and that the connecting means should not undergo plastic deformation under the effect of gravitational acceleration of 10 m/s$^2$ onto the tooth. For the very particularly preferred upper yield strength, it was assumed that the connecting means should undergo plastic deformation under the effect of a force of 1 N onto the prosthesis tooth; i.e. that at least from a weight force of 100 g onto the prosthesis tooth, a plastic deformation of the connecting means takes place. $10^7$ N/m$^2$ correspond to the effect of a force of 100 kg onto the prosthesis tooth as the upper limit for the beginning of the plastic deformation of the connecting means.

Preferably, the connecting means has a consistency such as paste or wax.

Connecting means with the yield strengths indicated are represented, due to the physical properties already described, by particularly suitable materials, with which the method according to the invention can be carried out particularly easily and without being prone to error.

With a further embodiment of the method according to the invention, it is also proposed that the prosthesis teeth located at the tooth sockets of the prosthesis base are fixed on the coronal side in a key, wherein, as a result, the location and the position of the prosthesis teeth in relation to one another are secured in the changed (or desired) position and/or alignment.

The expression "key" in the present invention is understood to mean a material or a device with which the prosthesis teeth are secured in a firm position and firm orientation relative to one another, without their position or alignment in relation to one another changing any further after securing to the key. Preferably, a silicone compound mass can be used as the key.

With the aid of the key, a definite and specific relative fixing of the prosthesis teeth to one another can be assured. Preferably, the key is produced with the aid of a CAD/CAM method, based on an existing CAD model of the dental prosthesis. For the application according to the invention and the production of the key, reference may be made to the not previously published DE 10 2014 109 563, of which the contents and features in this respect are adopted by reference into this present text.

It can further be provided that the prosthesis base and/or the prosthesis teeth is or are produced and/or processed with a CAM method or a Rapid Prototyping method.

The prosthesis base is produced in a known production process. For example, an additive method (such as stereolithography) or a subtractive method (milling) can be used. Other known methods, however, which are based on the use of powders and liquids, can also be used.

As a result of this, dental prosthesis parts produced with modern computer-based production methods can be processed subsequently with the least possible effort and expenditure with a method which exhibits the advantages according to the invention.

It can further be provided that in step D) the change of the position and/or the alignment of the at least one prosthesis tooth relative to the prosthesis base is carried out directly by adjustment fitting to the patient.

As a result of this, the situation can be achieved in which the dental prosthesis which has been produced fits the patient particularly well. For example, an occlusion test can be carried out on the patient, and in that context the position and/or the alignment of the prosthesis teeth to the prosthesis base can be adjusted to the occlusion conditions and the oral cavity situation of the patient before the connecting means is hardened.

According to a further embodiment of the method according to the invention, it can also be provided that, after step A) and before step B), the basal surfaces of the prosthesis teeth are swelled at least in some areas with a solvent, and/or the tooth sockets of the prosthesis base are swelled at least in some areas with a solvent.

As a result of this, a particularly stable connection of the prosthesis teeth to the prosthesis base is achieved. Due to the swelling, the surfaces become liquid or fluid respectively, such that these surfaces must be rehardened, and connected beforehand to the connecting means, and in this way a more stable connection is achieved over a greater thickness of the prosthesis material.

Preferably, it can also be provided that between steps A) and B) the exposed surfaces of the prosthesis teeth are roughed up at least in certain areas and swelled with a solvent, and/or the tooth sockets of the prosthesis base are roughed up at least in certain areas and swelled with a solvent.

Due to the additional abrading or roughing of the surfaces, the solvent can partially dissolve the surfaces more rapidly. The abrading or roughing of the surface can be incurred by the solvent. As well as this, the effective surface area for connection to the connecting means is enlarged, and therefore the retention of the prosthesis teeth in the prosthesis base is improved, and thereby the retention of the dental prosthesis is improved as a whole. In addition, according to the invention the prosthesis teeth and the prosthesis base can be cleaned with hot water or steam before swelling or roughing of the surfaces takes place, or before they are brought in contact with the connecting means.

It can further be provided that, as the solvent, a liquid containing methyl methacrylate is used.

It is also proposed that the tooth sockets of the prosthesis base are larger than the corresponding basal surfaces of the prosthesis teeth (or respectively than the corresponding basal surfaces of the prosthesis teeth which are provided for locating at or in the tooth sockets of the prosthesis base), such that the prosthesis teeth are movable in the tooth sockets of the prosthesis base, and preferably the prosthesis teeth in the tooth sockets of the prosthesis base can be tilted or rotated by up to 10°, and/or displaced by up to 1 mm in their position.

As a result of this, the necessary intermediate spaces for the movement capability of the prosthesis teeth relative to the prosthesis base are created, which according to the invention are at least in some areas filled with the plastically deformable connecting means for the variable stabilizing of the position and the alignment of the prosthesis teeth.

In this situation it can preferably be provided that surplus quantities of the connecting means are removed before or after the hardening.

With a further embodiment of the invention it can also be provided that a curable or hardenable plastic is used, preferably a cement paste from a powder and a liquid, and particularly a polymethyl methacrylate cement paste.

As a result of this, a particularly stable and easily produced connection can be established between the prosthesis teeth and the prosthesis base. Particularly preferred in this situation are cements which exhibit a short swell time and bubble-free hardening of the cement.

The connecting means for the final and permanent fixing of the prosthesis teeth in the prosthesis base should not be toxic, but should be volume-filling, color-stable, permanent in the connection, hydrolysis-resistant, and volume-stable when hardening, as well as having a suitable color which is stable over a long period of time. For this purpose PMMA-based cements come into consideration. In principle, for the implementation of a method according to the invention, permanently hardening modeling compounds are used as the connecting means, similar to the modeling compound FIMO®. Many of these modeling compounds are unsuitable, however, due to the poor connection with the plastic of the prosthesis base and the prosthesis teeth. Such modeling compounds do, however, have a suitable consistency and/or yield strength, and can be hardened relatively easily by means of a temperature treatment. Due to the better stability of the connection to the prosthesis base and to the prosthesis teeth, hardenable plastics with a similar consistency are preferred, i.e. a paste-like or wax-like consistency. Other materials which can in principle be used as connecting means for methods according to the invention are plastics used in the dental sector such as Versyo® from Heraeus Kulzer GmbH & Co. KG and Eclipse® from DeguDent GmbH.

It can further be provided that, after step D), and preferably before step E), the areas around the prosthesis teeth are modeled out in the connection to the prosthesis base, without thereby changing the position and alignment of the prosthesis teeth to the prosthesis base.

As a result of this, the situation is attained that the dental prosthesis which is produced is visually flawless, and does not exhibit any projections or cavities which are detrimental aesthetically or for hygienic reasons.

It can also be provided that the hardening of the plastically deformable connecting means in step E) is induced or takes place by spraying with an activator, by laying in a bath with an activator, by means of irradiating with UV light or with microwaves, by a temperature processing in a furnace or a water bath, by pressure, and/or by ultrasonics.

These measures are especially well-suited for the hardening of the connecting means. Such an induced hardening, by spraying with an activator, by laying in a bath with an activator, by means of irradiating with UV light or with microwaves, by a temperature treatment in a furnace or a water bath, and/or with ultrasonics, gives the user sufficient time to adjust the position and/or the alignment of the prosthesis teeth relative to the prosthesis base, and then allows for rapid further processing and completion of the dental prosthesis. Theoretically, as an alternative, it is also possible simply to wait for an adequately long period of time in which the connecting means hardens of its own accord. It is advantageous, however, if an influence can be exerted by own means on the hardening, or if this can be induced by own means.

It can further be provided that the consistency of the connecting means, in particular the yield strength and/or the toughness of the connecting means, changes within at least one hour by a maximum of 50%, preferably within at least three hours by a maximum of 50%, and particularly preferably within at least 50 hours by a maximum of 50%.

As a result of this, it can be ensured that sufficient time remains for the user to adjust the position and/or the alignment of the prosthesis teeth in or at the tooth sockets, and then achieving fixing by hardening, if appropriate in an external laboratory.

The objects on which the present invention is based are also solved by a dental prosthesis produced with such a method according to the invention.

The objects are also solved by a set for the carrying out of such a method, comprising a plastically deformable connecting means, a plurality of prosthesis teeth, and at least one prosthesis base.

In this situation it can be provided that the set comprises a means for the hardening of the connecting means, preferably a fluid activator, a UV light source, a microwave source, a furnace, a temperature-controlled liquid bath, an autoclave, and/or an ultrasound source, as means for hardening the connecting means.

The prosthesis teeth and/or the prosthesis base preferably consist of a plastic, for particular preference of polymethyl methacrylate (PMMA).

The prosthesis teeth can be present individually and/or connected in several groups or connected as complete rows of teeth. Connected prosthesis teeth are securely connected to one another.

The prosthesis base and the connecting means are preferably made of a rose-colored or pink plastic, and the prosthesis teeth of a tooth-colored plastic.

The invention is based on the surprising finding that it is possible by means of the invention for the position and the alignment of prosthesis teeth to be made at least slightly changeable, and then for the dental prosthesis to be finally completed in a simple manner by adjusting the position and/or the alignment of the prosthesis teeth in relation to the prosthesis base, and subsequent hardening of connecting means. For this purpose, in the framework of the present invention, a connecting means is used of which the consistency is selected in such a way that the position and alignment of the prosthesis teeth in the tooth sockets of the prosthesis base can be changed, but are stable without the effect of force, and which can be hardened to a solid and hard mass for the final connection of the prosthesis teeth to the prosthesis base.

The invention is therefore based on using a flexible material similar to a wax as the connecting means in an excess between the prosthesis teeth and the prosthesis base, with the possibility of a test fit and setting of artificial prosthesis teeth made of plastics or ceramics on a solid prosthesis base, as well as subsequent hardening with irreversible fixing of the artificial prosthesis teeth in the prosthesis base in the same material.

The individual tooth sockets or the entire tooth base on the rigid prosthesis base are in this situation configured in such a way that they can be provided with the flexible pink plastic as connecting means. The artificial prosthesis teeth are secured, aligned, and modeled in this flexible plastic. For final completion the flexible plastic can be hardened with an activator or UV light or microwaves.

The advantage consists of the fact that the connecting means, as a flexible and final material, is identical to the final fixing means for securing prosthesis teeth in the prosthesis base. As a result, fewer working steps are required, since the extracting of wax or embedding in plaster, such as are necessary with conventional methods, are not required. Problems which can arise with frequent rearrangements and corrections of the prosthesis teeth, are substantially reduced, and the entire method is simplified. There is no material exchange between wax and plastic, and the work sequences are also simplified.

BRIEF DESCRIPTION OF THE DRAWINGS

Exemplary embodiments of the invention are explained hereinafter on the basis of three schematically represented figures, but without thereby restricting the invention. The figures show.

In the figures, the same reference numbers are used for parts and features which are of the same type but are not necessarily the same, including in the different exemplary embodiments.

DETAILED DESCRIPTION

Figure 1:
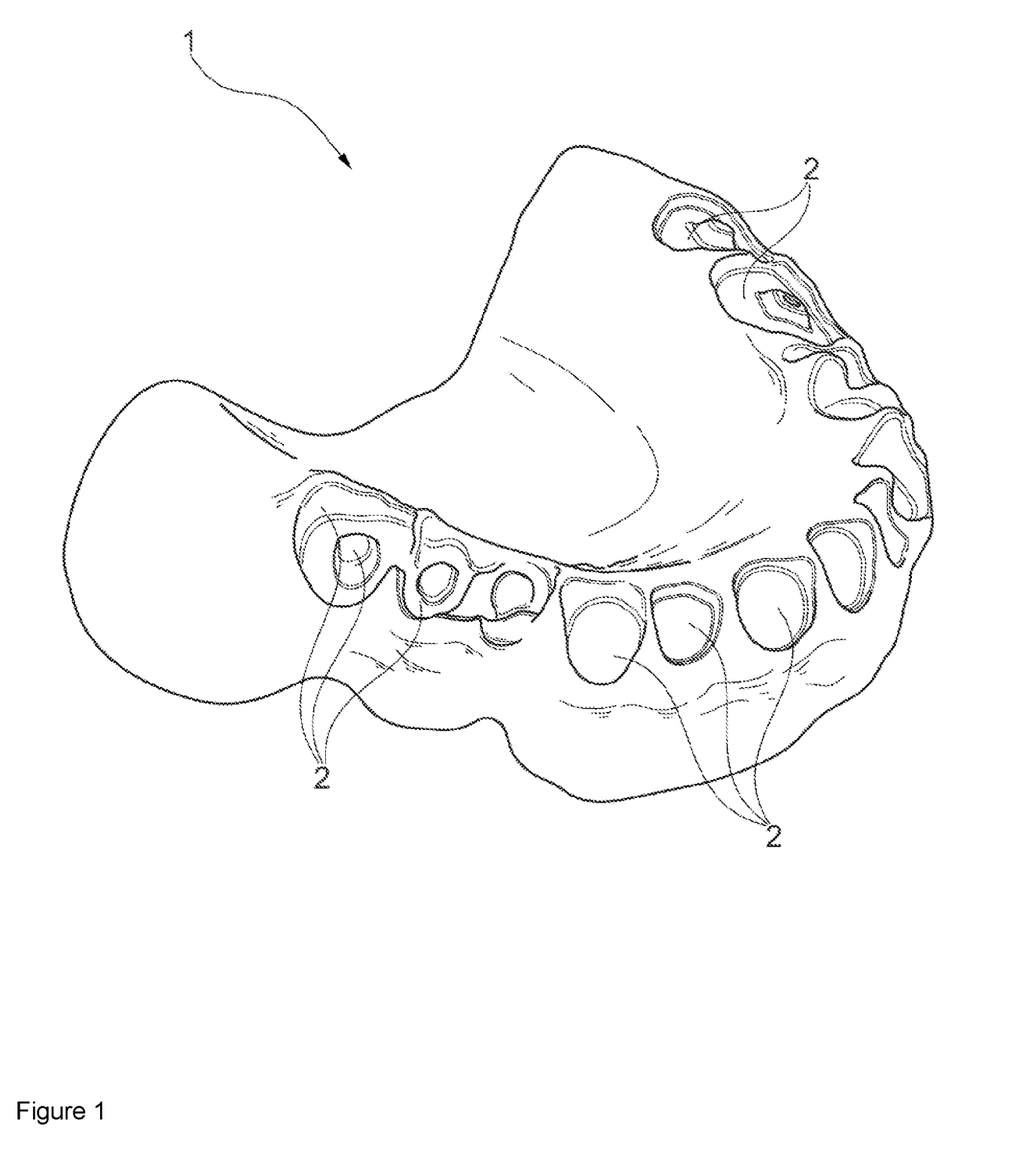
FIG. 1: A perspective view of a prosthesis base for a lower jaw for carrying out a method according to the invention.

FIG. 1 shows a perspective view of a prosthesis base 1 for a lower jaw, for carrying out a method according to the invention. The prosthesis base consists of a pink-colored plastic. The coloring and transparency are selected such as to match the appearance of the gum. Provided in the upper side of the prosthesis base 1 are a plurality of tooth sockets 2 for the fixing of prosthesis teeth (not shown in FIG. 1). The tooth sockets 2 are in this case formed as indentations in the jaw saddle of the prosthesis base 1. The connecting means (not shown in FIG. 1) can be introduced or located into these tooth sockets 2 for the connecting of the prosthesis teeth to the prosthesis base 1. The tooth sockets 2 can exhibit an indexing, such that the prosthesis teeth are only to be inserted in a specific orientation range in the prosthesis base 1, and, as far as is possible, each prosthesis tooth matches only to one specific tooth socket 2.

The tooth sockets 2 exhibit elevations arranged centrally in the indentations, which match with corresponding indentations in the basal ends of the prosthesis teeth (not shown in FIG. 1). As a result, it is possible to specify still more specifically and identifiably which prosthesis teeth should be set in which tooth sockets 2, and in which orientation the prosthesis teeth should be inserted into the tooth sockets 2. Specifically, with suitable symmetry breaking the elevations can serve as indexing elements. In addition, in this way a more stable connection of the prosthesis base 1 to the prosthesis teeth can be created. The indentations in the basal ends of the prosthesis teeth are larger than the elevations in the tooth sockets 2, in order to allow for a correction of the position and the alignment of the prosthesis teeth inside the tooth sockets 2. This does restrict the uniqueness of the positioning, but it is necessary for the variability which is intended according to the invention.

Figure 2:
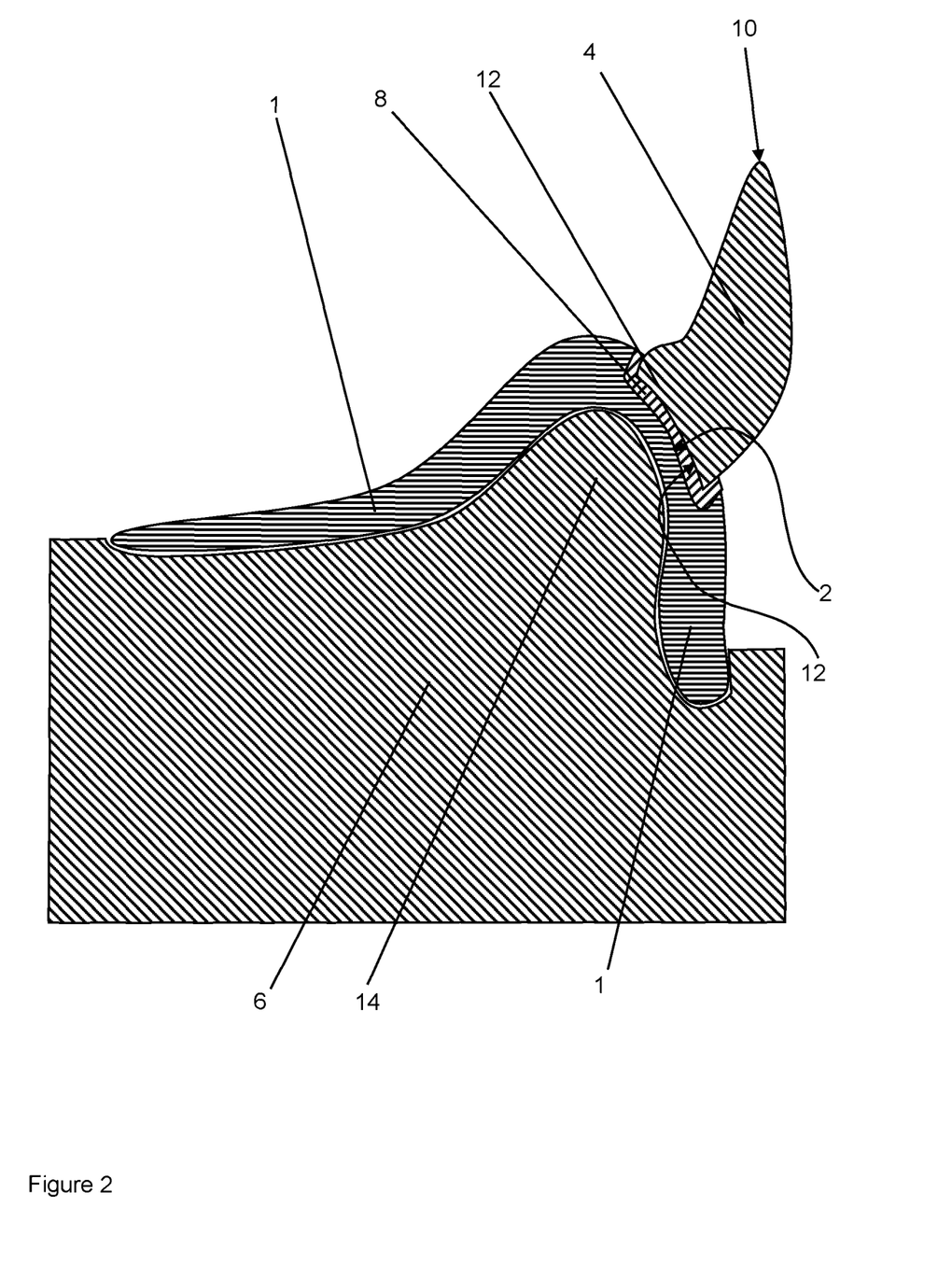
FIG. 2: a cross-section through a dental prosthesis, with which the prosthesis teeth are held by a connecting means in tooth sockets of a prosthesis base, on a model of the oral cavity of a patient.

FIG. 2 shows a cross-section view through a dental prosthesis in accordance with the invention or produced in accordance with the invention, where the prosthesis teeth 4 are held by a connecting means 8 in tooth sockets 2 of a prosthesis base 1, wherein the dental prosthesis model lies on a model 6 of the oral cavity of a patient. The cross-section plane lies in the transverse plane of the patient or is parallel to the transverse plane of the patient. The prosthesis teeth 4 are in this case configured as cutting teeth prostheses, or, respectively, as incisors.

Figure 3:
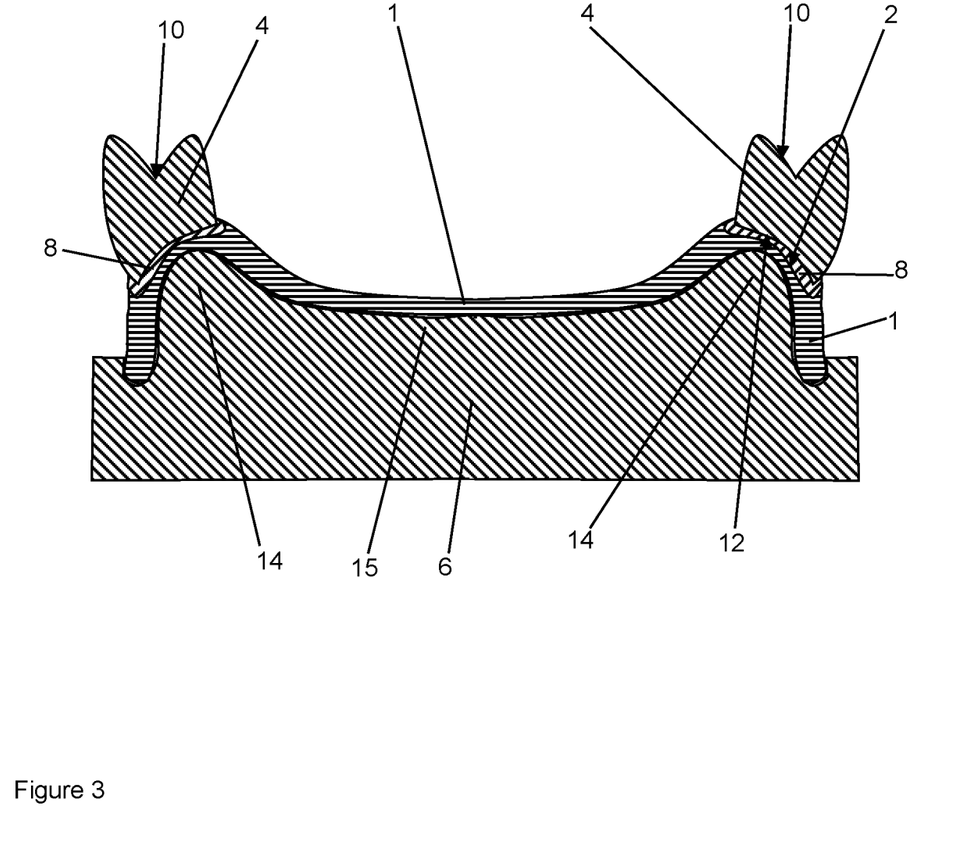
FIG. 3: a further cross-section through a dental prosthesis, with which the prosthesis teeth are held by a connecting means in tooth sockets of a prosthesis base on a model of the oral cavity of a patient.

FIG. 3 shows a cross-section of a dental prosthesis analogous to FIG. 2, wherein the section is represented as parallel to a frontal plane. The sectioned prosthesis teeth 4 are configured here as molars, or as posterior teeth prostheses.

The prosthesis teeth 4 consist of a hard white plastic, with a color and transparency which matches with teeth in general or with the teeth of the patient. Each prosthesis tooth 4 exhibits a coronal or occlusal surface 10 respectively (masticating surface) and a basal surface 12. The basal surface 12 is fixed in the tooth sockets 2. The connecting means 8 consists of a pink-colored hardenable plastic with the appearance of the gum. The connecting means 8 has a wax-type consistency, such as a paste, such that, while it is indeed plastically deformable under the effect of force, the prosthesis teeth used do not cause the connecting means 8 to be plastically deformed under their own weight. This consistency should hold the connecting means 8 for at least one hour, in order to allow for the processing of the position and/or the alignment of the prosthesis teeth 4 relative to the prosthesis base 1 without any great time pressure.

The tooth sockets 2 are somewhat larger than the basal counterpieces on the basal side 12 of the prosthesis teeth 4. Before the prosthesis teeth 4 are inserted for the first time into the tooth sockets 2 in the prosthesis base 1, the tooth sockets 2 and the prosthesis teeth 4 (at least the basal sides 12 of the prosthesis teeth 4) are cleaned and, to improve the connection with the connecting means 8, are abraded and swelled with a solvent. Next, the connecting means 8 are applied onto the basal sides 12 of the prosthesis teeth 4 and/or to the tooth sockets 2. The connecting means 8 is then, after the placing of the prosthesis teeth 4, arranged between the prosthesis base 1 and the prosthesis teeth 4. As a result, the prosthesis teeth 4 inserted in the prosthesis base 1 are easily movable, and so allow the dentist or the user to make minor corrections to the position and alignment of the prosthesis teeth 4 in the prosthesis base 1. As a result, the position and the alignment of the prosthesis teeth 4 in the prosthesis base 1 can be adjusted to the needs of a patient for whom the dental prosthesis which has been produced is intended. The data necessary for the alignment and positioning of the prosthesis teeth 4 is acquired from the patient directly or with the aid of CAD methods and/or images (3D scans), or with the aid of articulators and impressions. The easiest method is for the prosthesis base 1 with the prosthesis teeth 4 fitted to be introduced to the patient, and the position and alignment then adjusted to the oral cavity situation of the patient.

For the purposes of securing, the connecting means 8 is used in excess, such that the intermediate spaces between the tooth sockets 2 and the prosthesis teeth 4 are filled with the connecting means 8, without basal cavities remaining in the intermediate spaces, and without peripheral gaps remaining in the area of the gingiva-tooth neck of the dental prosthesis. In addition, the excess allows for the contact surfaces to be optimally wetted. Any excess residue of the connecting means 8 emerging due to swelling can be removed before the hardening and/or after the hardening.

In the embodiments represented in FIGS. 2 and 3, the connecting means 8 is arranged completely between the prosthesis teeth 4 and the surface of the tooth sockets, without any contact being identifiable between the prosthesis teeth 4 and the tooth sockets 2. The prosthesis teeth 4 can also be inserted into the tooth sockets 2 in such a way that the basal sides 12 of the prosthesis teeth 4 are in contact at the tooth sockets 2 at individual points and/or flush-surface in certain areas.

Once the adjustment has been accomplished of the location and orientation of the prosthesis teeth 4 in the prosthesis base 1, the prosthesis teeth 4 are permanently fixed in the prosthesis base 1, in that the connecting means 8 is hardened. In this situation, the prosthesis teeth 4 must not be allowed to be subjected to mechanical loading in such a way that their alignment or position is changed. This can take place, for example, under temperature-induced conditions in a temperature-controlled water bath or a furnace.

As an alternative, use can be made as connecting means 8 of a self-hardening cement on a powder-liquid base, which is stirred into such a mixture that it exhibits a consistency similar to wax, which is suitable for the changing of the position and the alignment of the prosthesis teeth 4 in the prosthesis base 1. Likewise, the hardening of the cement can be awaited or actively induced or carried out, such that the connecting means 8 exhibits the desired consistency or, respectively, the desired yield strength. Light-hardening cements or adhesives are particularly well-suited in this situation, if the plastics used have light-conductive properties, and therefore the light can penetrate not only into the peripheral areas of the intermediate spaces between the prosthesis teeth 4 and the prosthesis base 1. Microwave-hardening connecting means 8 can be suitable if plastics are being used which are not light-conducting, since the microwaves then attain a better penetration depth than light.

Likewise well-suited, due to the rapid swelling time and the bubble-free hardening at room temperature even without an autoclave (i.e. without overpressure), are prosthesis substances on a powder-liquid base which harden at room temperature.

The prosthesis base 1 lies in the upper jaw on a jaw arch 14 or jaw ridge 14 and a palate 15 of the model 6 of the oral cavity, in order to provide the user with the relevant anatomical structures of the oral cavity of the patient and in order to hold the prosthesis base 1 stable. For producing a prosthesis base for the lower jaw, a corresponding model (not shown) of the lower jaw is used.

The method according to the invention can be carried out with prosthesis bases 1 which are produced manually or by means of a Rapid Prototyping method. Likewise, the method can also be applied to printed prosthesis teeth or prosthesis teeth rows. The features of the invention disclosed in the foregoing description and in the claims, figures, and exemplary embodiments can be substantial elements both alone as well as in any desired combination for the realization of the invention in its various embodiment forms.

REFERENCE NUMBER LIST

1 Prosthesis base
2 Dental socket for the fixing of prosthesis teeth
4 Prosthesis tooth
6 Model of the oral cavity
8 Connecting means
10 Coronal surface of the prosthesis tooth
12 Basal surface/side of the prosthesis tooth
14 Jaw arch/jaw ridge of the model of the oral cavity
15 Palate of the model of the oral cavity

The invention claimed is:

1. Method for producing a dental prosthesis for an oral cavity of a patient from a prosthesis base and a plurality of prosthesis teeth, the method comprising the following chronological steps:
   A) providing the prosthesis teeth and the prosthesis base, wherein the prosthesis base comprises tooth sockets for approximately locating basal surfaces of the prosthesis teeth, wherein the tooth sockets of the prosthesis base are larger than corresponding basal surfaces of the prosthesis teeth, such that the prosthesis teeth are movable in the tooth sockets of the prosthesis base, and wherein the prosthesis base and/or the prosthesis teeth is or are produced and/or processed with a CAM process or a rapid-prototyping process,
   B) applying a plastically deformable connecting material onto the tooth sockets and/or onto basal ends of the prosthesis teeth,
   C) locating the prosthesis teeth into the tooth sockets of the prosthesis base with the connecting material disposed between and in contact with the basal ends of the prosthesis teeth and the tooth sockets to connect the basal ends of the prosthesis teeth to the tooth sockets of the prosthesis base such that the prosthesis teeth, after being located in the tooth sockets, are movable relative to the prosthesis base, wherein a position and an alignment of the prosthesis teeth to the prosthesis base are retained if no external force is exerted onto the prosthesis teeth,
   D) manually changing the position and/or the alignment of at least one prosthesis tooth in the prosthesis base without removing the at least one prosthesis tooth from the tooth socket, and E) subsequently to step D), hardening the plastically deformable connecting material to securely fix the prosthesis teeth to the prosthesis base, wherein the change in the position and/or the alignment of the prosthesis teeth in relation to the prosthesis base are retained, and wherein at least step E) is carried out externally of the patient's oral cavity.

2. Method according to claim 1, comprising in step D) plastically deforming the connecting material during movement of the prosthesis teeth relative to the prosthesis base or a change of the position and/or the alignment of the at least one prosthesis tooth relative to the prosthesis base.

3. Method according to claim 1, comprising in step D) exerting a force on the at least one prosthesis tooth to change the position and/or the alignment of the at least one prosthesis tooth relative to the prosthesis base.

4. Method according to claim 3, wherein the prosthesis base is fixed before exertion of the force in step D) and, at least during exertion of the force on the at least one prosthesis tooth, the prosthesis base remains fixed.

5. Method according to claim 1, wherein the connecting material exhibits a yield strength, below which yield strength the connecting material is elastic, and above which yield strength the connecting means is plastically deformable.

6. Method according to claim 5, wherein the connecting material exhibits a yield strength of between 104 N/m² and 107 N/m².

7. Method according to claim 6, wherein the connecting material exhibits a yield strength of between 104 N/m² and 106 N/m².

8. Method according to claim 6, wherein the connecting material exhibits a yield strength of between 104 N/m² and 105 N/m².

9. Method according to claim 1, comprising fixing the prosthesis teeth located in the tooth sockets of the prosthesis base on a coronal side in a key, wherein, as a result, the location and the position of the prosthesis teeth in relation to one another are secured in the changed position and/or alignment.

10. Method according to claim 1, comprising in step D) changing the position and/or the alignment of the at least one prosthesis tooth relative to the prosthesis base directly by adjustment to the patient.

11. Method according to claim 1, comprising after step A) and before step B), swelling basal surfaces of the prosthesis teeth at least in some areas by a solvent, and/or swelling the tooth sockets of the prosthesis base at least in some areas by a solvent.

12. Method according to claim 1, wherein in step D) the prosthesis teeth in the tooth sockets of the prosthesis base can be tilted or rotated by up to 10° and/or displaced by up to 1 mm in position.

13. Method according to claim 1, wherein the connecting material is a curable or hardenable plastic.

14. Method according to claim 13, wherein the connecting material is a cement paste formed of a powder and a liquid.

15. Method according to claim 14, wherein the connecting material is a polymethyl methacrylate cement paste.

16. Method according to claim 1, comprising after step D), modeling areas around the prosthesis teeth in the connection to the prosthesis base, without thereby changing the position and alignment of the prosthesis teeth in relation to the prosthesis base.

17. Method according to claim 16, comprising after step D), and before step E), modeling areas around the prosthesis teeth in the connection to the prosthesis base, without thereby changing the position and alignment of the prosthesis teeth in relation to the prosthesis base.

18. Method according to claim 1, comprising inducing or carrying out hardening of the plastically deformable connecting material in step E) by spraying with an activator, by laying in a bath with an activator, by irradiation with UV light or with microwaves, by temperature treatment in a furnace or water bath, and/or with ultrasonics.

19. Method according to claim 1, wherein a consistency of the connecting material changes by no more than 50% within one hour.

20. Method according to claim 19, wherein the consistency of the connecting material changes by no more than 50% within three hours.

21. Method according to claim 20, wherein the consistency of the connecting material changes by no more than 50% within 50 hours.

22. Method according to claim 19, wherein the consistency of the connecting material is at least one of a yield strength and a toughness of the connecting material.

23. Method according to claim 1, comprising carrying out said steps A) through C) and E) externally of the patient's oral cavity.

* * * * *